(12) United States Patent
Muchovej et al.

(10) Patent No.: US 12,519,672 B2
(45) Date of Patent: *Jan. 6, 2026

(54) ENGAGEMENT ANALYSIS BETWEEN GROUPS OF PARTICIPANTS

(71) Applicant: Zoom Communications, Inc., San Jose, CA (US)

(72) Inventors: Stephen Muchovej, Bishop, CA (US); Min Xiao-Devins, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/675,918

(22) Filed: May 28, 2024

(65) Prior Publication Data

US 2024/0313994 A1 Sep. 19, 2024

Related U.S. Application Data

(63) Continuation of application No. 17/685,310, filed on Mar. 2, 2022, now Pat. No. 12,034,556.

(51) Int. Cl.
*H04L 12/18* (2006.01)
*G10L 15/08* (2006.01)
*G10L 15/26* (2006.01)

(52) U.S. Cl.
CPC .......... *H04L 12/1831* (2013.01); *G10L 15/08* (2013.01); *G10L 15/26* (2013.01); *H04L 12/1822* (2013.01); *G10L 2015/088* (2013.01)

(58) Field of Classification Search
CPC .................. H04L 12/1831; H04L 12/1822
See application file for complete search history.

(56) References Cited

U.S. PATENT DOCUMENTS

| | | | |
|---|---|---|---|
| 10,116,801 B1 | 10/2018 | Christiano et al. | |
| 11,188,718 B2 | 11/2021 | Breedvelt-Schouten et al. | |
| 11,252,202 B2 * | 2/2022 | Candello | G06F 40/35 |
| 11,405,589 B1 * | 8/2022 | Tran | H04L 12/1822 |
| 11,546,550 B2 | 1/2023 | Pollefeys | |
| 11,556,717 B2 * | 1/2023 | Chopdekar | H04L 51/18 |

(Continued)

OTHER PUBLICATIONS

International Search Report and Written Opinion mailed on May 31, 2023 in corresponding PCT Application No. PCT/US2023/014238.

(Continued)

*Primary Examiner* — Nam T Tran
(74) *Attorney, Agent, or Firm* — Young Basile Hanlon & MacFarlane, P.C.

(57) ABSTRACT

In one embodiment, the system connects to a communication session with a number of participants; receives a transcript of a conversation between the participants; extracts utterances from the transcript; associates a subset of the utterances with a first group of speakers and the remaining subset of the utterances with a second group of speakers; calculates one or more statistical metrics for a number of engagement metrics based on the utterances of the first group of speakers and the utterances of the second group of speakers; assigns a weight to each of the engagement metrics; determines an engagement score for the communication session based on the assigned weights for the engagement metrics; and presents, to one or more users, the engagement score for the communication session.

20 Claims, 8 Drawing Sheets

(56) References Cited

U.S. PATENT DOCUMENTS

| | | |
|---|---|---|
| 11,677,991 B1 | 6/2023 | Balannik |
| 11,811,585 B2* | 11/2023 | Han ............... G06F 40/35 |
| 2006/0075422 A1* | 4/2006 | Choi .............. G01S 3/7864 |
| | | 725/18 |
| 2012/0140681 A1 | 6/2012 | Kaminsky et al. |
| 2013/0144603 A1 | 6/2013 | Lord et al. |
| 2014/0337073 A1 | 11/2014 | Meehan |
| 2015/0154291 A1* | 6/2015 | Shepherd ......... H04L 67/535 |
| | | 707/748 |
| 2016/0073054 A1 | 3/2016 | Balasaygun et al. |
| 2019/0066021 A1* | 2/2019 | Tang ............... H04L 67/535 |
| 2019/0079579 A1 | 3/2019 | Bastide et al. |
| 2021/0076002 A1* | 3/2021 | Peters ............. H04N 7/152 |
| 2021/0134302 A1 | 5/2021 | Kwon |
| 2021/0264921 A1* | 8/2021 | Reece ............. G06F 40/169 |
| 2021/0287668 A1* | 9/2021 | Stelmar Netto ..... G06N 5/02 |
| 2022/0121712 A1 | 4/2022 | Cromack et al. |
| 2022/0157301 A1 | 5/2022 | O'Connor et al. |
| 2022/0230648 A1 | 7/2022 | Kwon et al. |
| 2022/0270612 A1 | 8/2022 | Ahmed et al. |
| 2022/0415327 A1 | 12/2022 | Fowers et al. |
| 2023/0134143 A1* | 5/2023 | Chau ............... H04L 12/1831 |
| | | 709/204 |

OTHER PUBLICATIONS

Anita H M Cremers et al: "Making Remote 'Meeting Hopping' Work: Assistance to Initiate, Join and Leave Meetings", Sep. 8, 2008 (Sep. 8, 2008), Machine Learning for Multimodal Interaction; [Lecture Notes in Computer Science], Springer Berlin Heidelberg, Berlin, Heidelberg, pp. 315-324, XP019104356, ISBN: 978-3-540-85852-2 abstract section 5.

* cited by examiner

| TEXT | LEMMA | POS | TAG | DEP | SHAPE | ALPHA | STOP |
|---|---|---|---|---|---|---|---|
| Apple | apple | PROPN | NNP | nsubj | Xxxxx | True | False |
| is | be | AUX | VBZ | aux | xx | True | True |
| looking | look | VERB | VBG | ROOT | xxxx | True | False |
| at | at | ADP | IN | prep | xx | True | True |
| buying | buy | VERB | VBG | pcomp | xxxx | True | False |
| U.K. | u.k. | PROPN | NNP | compound | X.X. | False | False |
| startup | startup | NOUN | NN | dobj | xxxx | True | False |
| for | for | ADP | IN | prep | xxx | True | True |
| $ | $ | SYM | $ | quantmod | $ | False | False |
| 1 | 1 | NUM | CD | compound | d | False | False |
| billion | billion | NUM | CD | pobj | xxxx | True | False |

FIG. 3

| Engagement Metric | Params | Suggested Weight | Rationale |
|---|---|---|---|
| number of speaker changes | mu = 3.5<br>sigma = 1.4 | 0.5 | This seems like the most likely to determine engagement |
| speaker talk ratio | mu = 0.6<br>sigma = 0.2 | 0.2 | this is the most biased one. |
| speaker transition lag | mu = 0.94<br>sigma = 0.375 | 0.3 | |

ENGAGEMENT ANALYSIS BETWEEN GROUPS OF PARTICIPANTS

CROSS-REFERENCE TO RELATED APPLICATION(S)

This application is a continuation of U.S. patent application Ser. No. 17/685,310, filed Mar. 2, 2022, the entire disclosure of which is hereby incorporated by reference.

FIELD OF INVENTION

The present invention relates generally to digital communication, and more particularly, to systems and methods for providing engagement analysis for remote communication sessions.

SUMMARY

The appended claims may serve as a summary of this application.

BRIEF DESCRIPTION OF THE DRAWINGS

The present invention relates generally to digital communication, and more particularly, to systems and methods for providing engagement analysis for remote communication sessions.

The present disclosure will become better understood from the detailed description and the drawings, wherein:

FIG. 3 is a diagram illustrating one example embodiment of analyzing sentence structure for calculating statistical metrics for a number of engagement metrics.

FIG. 5 is a diagram illustrating one example embodiment of engagement metrics and their assigned weights.

FIG. 6 is a diagram illustrating one example embodiment of a user interface for presenting an engagement score for a communication session.

DETAILED DESCRIPTION

Figure 1A:
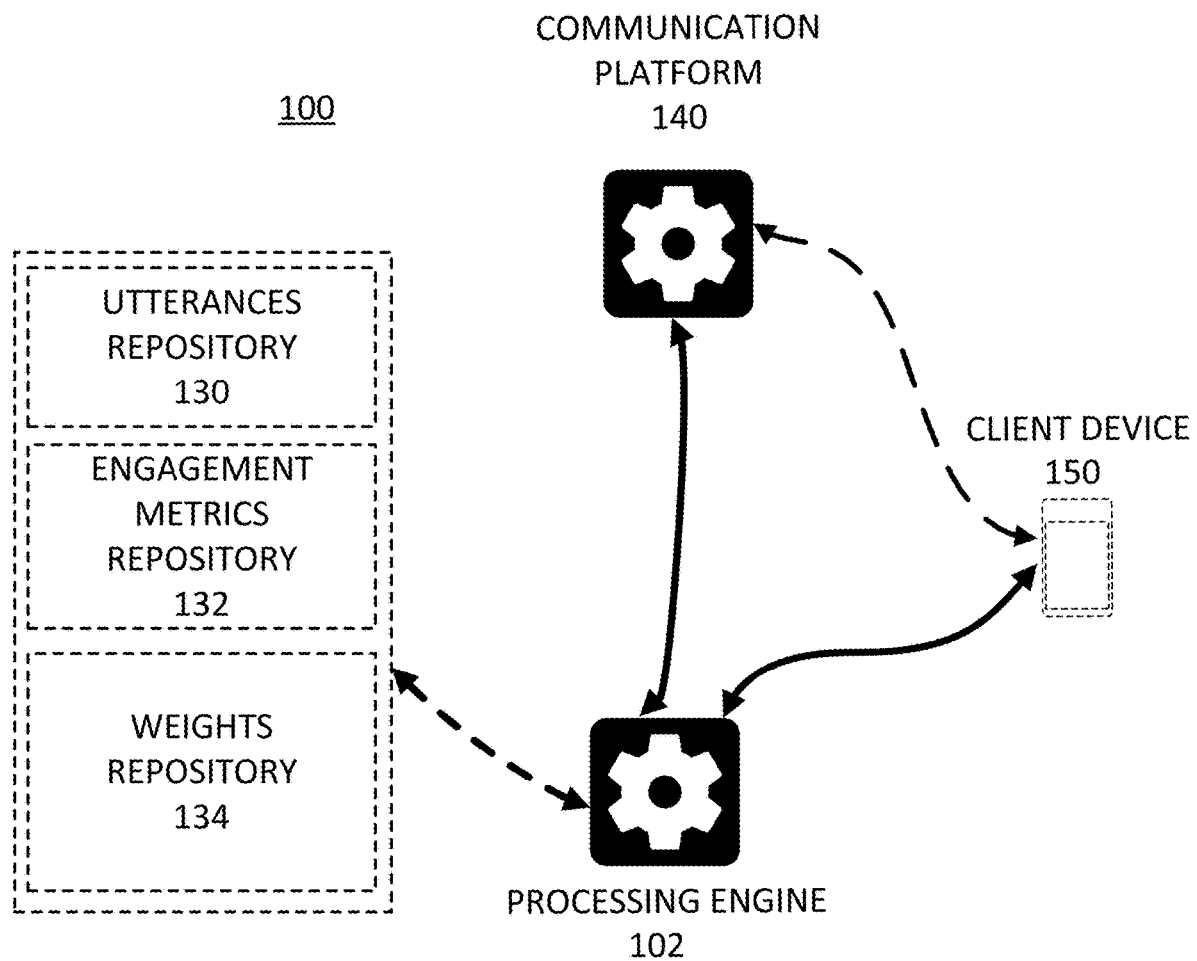
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Digital communication tools and platforms have been essential in providing the ability for people and organizations to communicate and collaborate remotely, e.g., over the internet. In particular, there has been massive adopted use of video communication platforms allowing for remote video sessions between multiple participants. Video communications applications for casual friendly conversation ("chat"), webinars, large group meetings, work meetings or gatherings, asynchronous work or personal conversation, and more have exploded in popularity.

With the ubiquity and pervasiveness of remote communication sessions, a large amount of important work for organizations gets conducted through them in various ways. For example, a large portion or even the entirety of sales meetings, including pitches to prospective clients and customers, may be conducted during remote communication sessions rather than in-person meetings. Sales teams will often dissect and analyze such sales meetings with prospective customers after they are conducted. Because sales meetings may be recorded, it is often common for a sales team to share meeting recordings between team members in order to analyze and discuss how the team can improve their sales presentation skills.

Such techniques are educational and useful, and can lead to drastically improved sales performance results for a sales team. However, such recordings of meetings simply include the content of the meeting, and the communications platforms which host the meetings do not provide the sorts of post-meeting, or potentially in-meeting, intelligence and analytics that such a sales team would find highly relevant and useful to their needs.

One such use case which is currently lacking includes analytics data and metrics around the engagement of one group or party to the meeting. Within a sales context, of particular importance is whether or not the customer or prospective customer is "engaged" during the meeting. While engagement can be defined in a number of ways, a group is likely engaged if there is a lot of interaction or back-and-forth discussion between that group and another group during the meeting. For example, during a remote communication session for a sales meeting, if a prospective customer is actively participating in a back-and-forth conversation with a sales representative or multiple sales representatives, then it is more likely that they may be considered "engaged". There may be one or more ways to measure the extent to which such conversation is indicative of engagement. Several other such engagement metrics may be considered as well. The metrics for engagement may differ depending upon different contexts. A measurement or indication of engagement can be highly valuable for sales teams and other groups or individuals, in order to understand a group's behavior overall or for specific topics or strategies, to gauge effectiveness of a conversation or sales pitch, to formulate strategies for improving customer or group response to a pitch or recommendation, and more.

Thus, there is a need in the field of digital communication tools and platforms to create a new and useful system and method providing engagement analysis for a remote communication session. The source of the problem, as discovered by the inventors, involves at least a lack of statistical analysis based on relevant engagement metrics, a lack of utilizing time and speaker data within a conversation, and a lack of accounting for context such as identification of speakers belonging to specific groups or parties.

In one embodiment, the system connects to a communication session with a number of participants; receives a transcript of a conversation between the participants produced during the communication session; extracts, from the transcript, utterances including one or more sentences spoken by the participants; associates a subset of the utterances with a first group of speakers and the remaining subset of the utterances with a second group of speakers; calculates one or more statistical metrics for a number of engagement metrics based on the utterances of the first group of speakers and the utterances of the second group of speakers; assigns a weight to each of the engagement metrics; determines an engagement score for the communication session based on the assigned weights for the engagement metrics; and presents, to one or more users, the engagement score for the communication session.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150 is connected to a processing engine 102 and, optionally, a communication platform 140. The processing engine 102 is connected to the communication platform 140, and optionally connected to one or more repositories and/or databases, including, e.g., an utterances repository 130, an engagement metrics repository 132, and/or a weights repository 134. One or more of the databases may be combined or split into multiple databases. The user's client device 150 in this environment may be a computer, and the communication platform 140 and processing engine 102 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
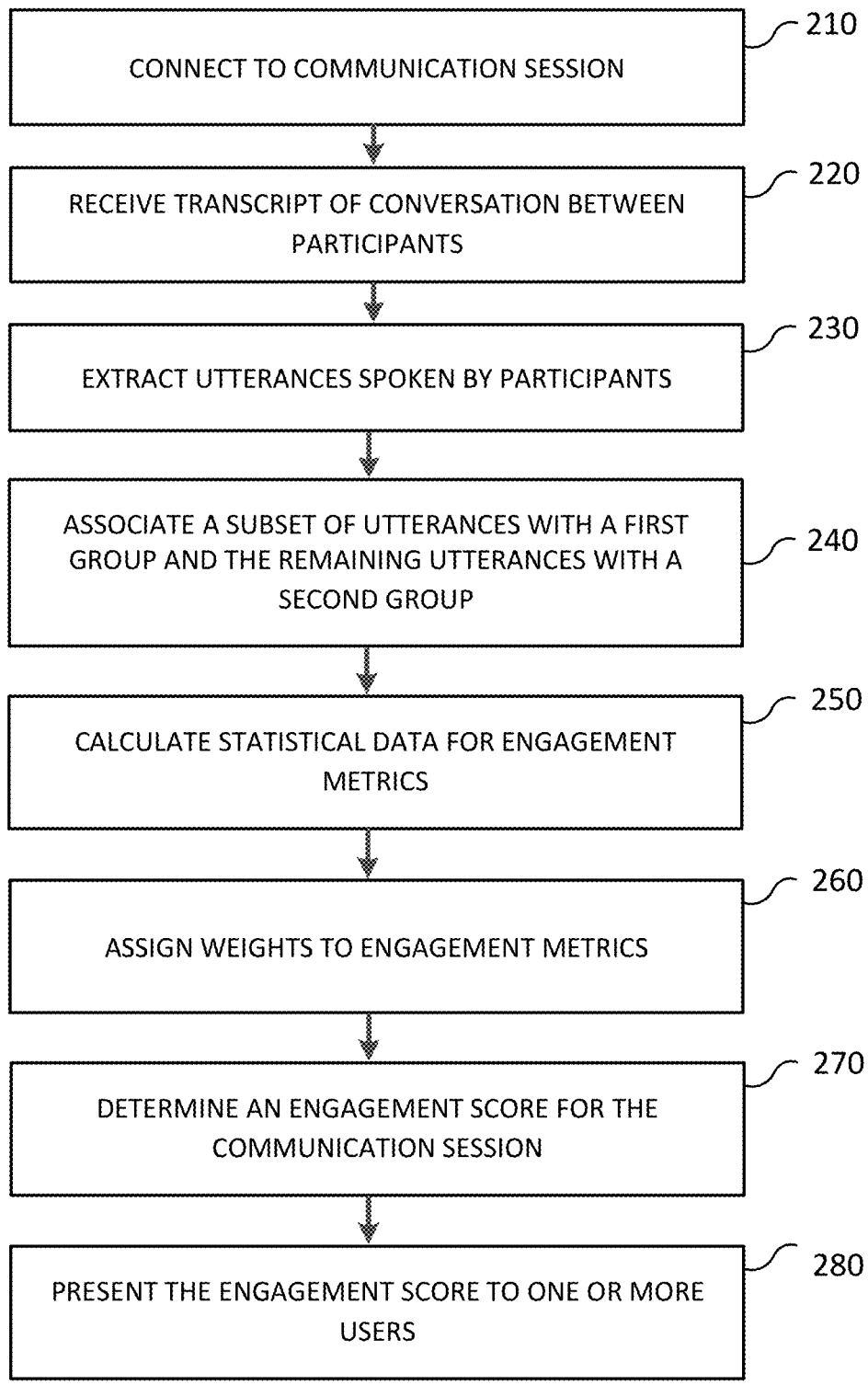
FIG. 2 is a flow chart illustrating an exemplary method that may be performed in some embodiments.

In an embodiment, the processing engine 102 may perform the exemplary method of FIG. 2 or other method herein and, as a result, provide engagement analysis for a remote communication session. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 150. In some embodiments, one or more of the communication platform 140, processing engine 102, and client device 150 may be the same device. In some embodiments, the user's client device 150 is associated with a first user account within a communication platform, and one or more additional client device(s) may be associated with additional user account(s) within the communication platform.

In some embodiments, optional repositories can include an utterances repository 130, an engagement metrics repository 132, and/or a weights repository 134. The optional repositories function to store and/or maintain, respectively, information on utterances within the session; engagement metrics and their associated statistical metrics; and data relating to weight assignments for weighting engagement metrics. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communicating with one another by video), or many-to-many (e.g., multiple participants video conferencing with each other in a remote group setting).

Figure 1B:
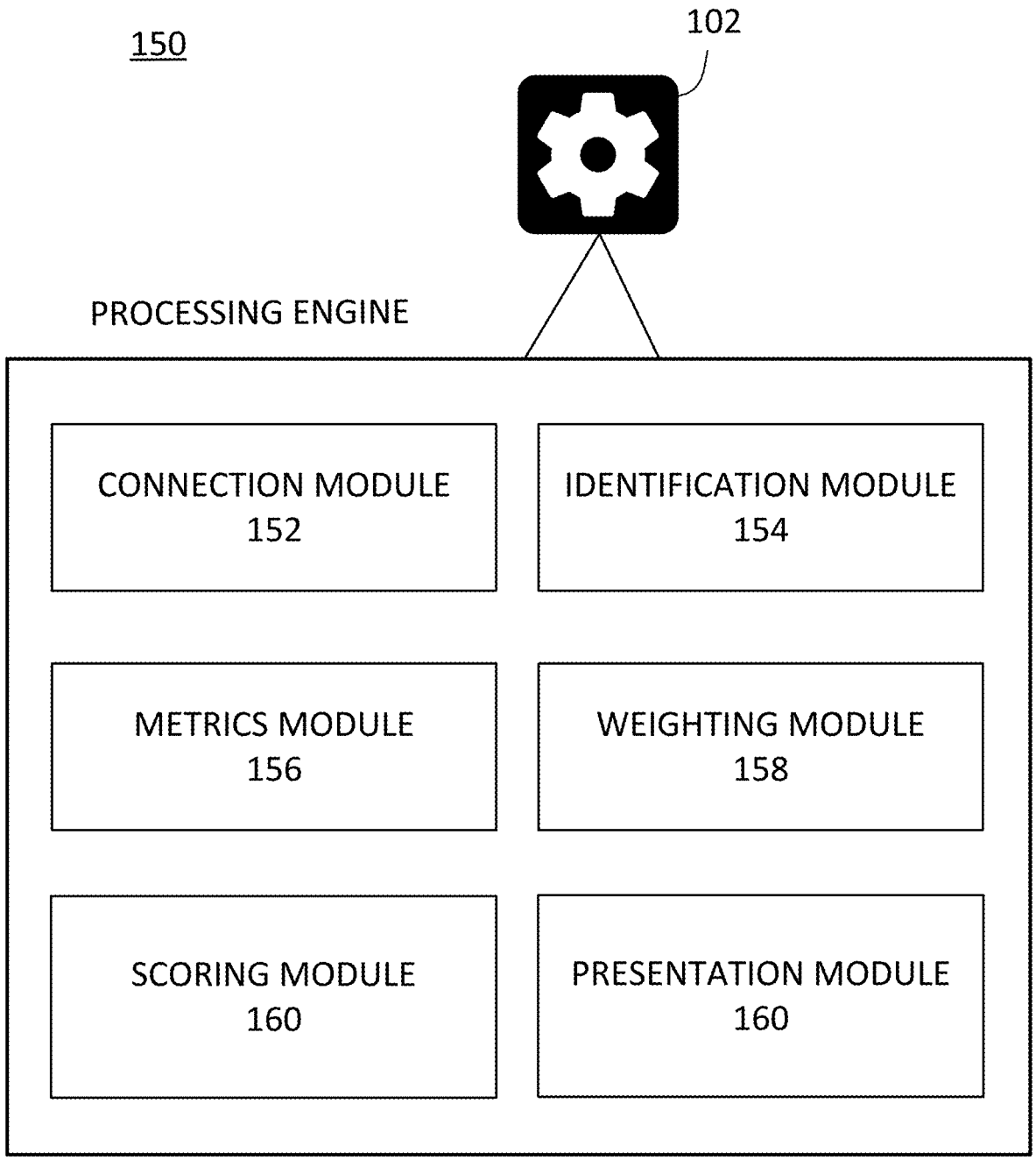
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Connection module 152 functions to connect to a communication session with a number of participants, and receive a transcript of a conversation between the participants produced during the communication session.

Identification module 154 functions to extract, from the transcript, a number of utterances each including one or more sentences spoken by the participants, then associates a subset of the utterances with a first group of speakers and the remaining subset with a second group of speakers;

Metrics module 156 functions to calculate statistical metrics for a number of engagement metrics based on the utterances of the first group of speakers and the utterances of the second group of speakers.

Weighting module 158 functions to assign or adjust a weight for each engagement metric.

Scoring module 160 functions to determine an engagement score for the communication session based on the assigned weights for the engagement metrics.

Presentation module 162 functions to present, to one or more users, the engagement score for the communication session.

The above modules and their functions will be described in further detail in relation to an exemplary method below.

FIG. 2 is a flow chart illustrating an exemplary method that may be performed in some embodiments.

At step 210, the system connects to a communication session (e.g., a remote video session, audio session, chat session, or any other suitable communication session) having a number of participants. In some embodiments, the communication session can be hosted or maintained on a communication platform, which the system maintains a connection to in order to connect to the communication session. In some embodiments, the system displays a UI for each of the participants in the communication session. The UI can include one or more participant windows or participant elements corresponding to video feeds, audio feeds, chat messages, or other aspects of communication from participants to other participants within the communication session.

At step 220, the system receives a transcript of a conversation between the participants produced during the communication session. That is, the conversation which was produced during the communication is used to generate a transcript. The transcript is either generated by the system, or is generated elsewhere and retrieved by the system for use in the present systems and methods. In some embodiments, the transcript is textual in nature. In some embodiments, the transcript includes a number of utterances, which are composed of one or more sentences attached to a specific speaker of that sentence (i.e., participant). Timestamps may be attached to each utterance and/or each sentence. In some embodiments, the transcript is generated in real-time while the communication session is underway, and is presented after the meeting has terminated. In other embodiments, the transcript in generated in real-time during the session and also presented in real-time during the session. In some embodiments, the timestamps are associated, at least in part, with the beginning of speaker statements.

At step 230, the system extracts utterances spoken by the participants. Utterances are recognized by the system as one or more sentences attached to a specific speaker of that sentence (i.e., participant). Timestamps, as well as a speaker who uttered the utterance, may be attached to each utterance and/or each sentence. In some embodiments, the transcript itself provides clear demarcation of utterances based on the timestamps which are placed at the start of each utterance. Thus, extracting these utterances may involve extracting the separate utterances which have been demarcated by the timestamps in the transcript.

At step 240, the system associates a subset of the utterances with a first group of speakers and the remaining subset of the utterances with a second group of speakers.

In some embodiments, the system first identifies a subset of the utterances spoken by a subset of the participants with a first group of speakers. In some embodiments, the first group of speakers is representative of a prespecified organization, and the second group of speakers is representative of the remaining speakers outside of the prespecified organization. The prespecified organization may be, e.g., a business entity or company, department, team, organization, or any other suitable organization. In some embodiments, team members may identify themselves and/or one another as members, employees, contractors, or otherwise associated with the organization. In some embodiments, hierarchical relationships between users associated with the organization can be formed due to users explicitly providing such information, via the system implicitly drawing connections based on additional information, or some combination thereof. In some embodiments, a reporting chain of command can be established based on such implicit or explicit hierarchical relationships. In some embodiments, the system identifies that the participant is part of the organization upon the participant logging into the communication platform. In some embodiments, if the domain of the email address associated with the participant is the same email domain as a known member of an organization, they may be presumed to be associated with the organization as well.

In some embodiments, within the context of a sales meeting involving sales representatives and prospective customers, the system can use organizational data to determine which participants are sales representatives and which participants are the customer or prospective customer on the receiving end of the sales pitch or sales discussion. The first group of speakers may then represent the sales representatives, while the second group of speakers represents the customer of prospective customer.

In some embodiments, the first group of speakers may be associated with multiple prespecified organizations representing a unified body. For example, multiple sales teams from different departments may be speaking to a single prospective customer, or multiple different companies collaborating together may meet with a prospective customer. In both cases, the multiple sales teams may be associated with a first group of speakers, and the multiple different companies may also be associated with a first group of speakers. In both cases, the remaining subset of the utterances is associated with a second group of speakers. In this case, the second group of speakers represents the prospective customer.

At step 250, the system calculates one or more statistical metric(s) for a number of engagement metrics for the communication session based on the utterances of the first group of speakers and the utterances of the second group of speakers.

Within this context, an engagement metric may be any metric by which to measure engagement within a communication session. Statistical metric(s) for an engagement metric may represent data which is based on statistical modeling. In some embodiments, the statistical modeling represents how the engagement metric for this particular communication session compares to a distribution curve which is modeled for this communication session as well as a multitude of previous communication sessions.

In some embodiments, one of the engagement metrics used for a communication session is the average number of speaker changes per minute within the communication session. The number of speaker changes per minute is representative of the interactivity and engagement within the communication session. In some embodiments, the metric is the number of speaker changes between the first group of speakers and the second group of speakers, rather than the overall number of speaker changes. For example, this metric may measure the change in speaker from a sales team representative to a prospective customer, and vice versa, but may not measure the change in speaker from one sales team representative to a different sales team representative. In some embodiments, the statistical metrics for the number of speaker changes between the first group of speakers and the second group of speakers are normalized per minute during the communication session.

In some embodiments, one of the engagement metrics used for a communication session is the ratio of the first group of speakers' speaking time to the second group of speakers' speaking time. This may also be phrased as, e.g., the ratio of representative talk time to customer talk time, where the context is a meeting between a sales representative and a customer. This metric represents how much time the second group spends speaking relative to how much time the first group spends speaking. In some embodiments, this metric is normalized for different meeting lengths. For example, the distribution curve for a meeting that's 10 minutes long may look different than a distribution curve for a meeting that's 60 minutes long, and thus the meeting length is normalized to account for this.

In some embodiments, one of the engagement metrics used for a communication session is the ratio of time lag between statements from the first group of speakers and responses from the second group of speakers during the communication session. This may be rephrased as measuring the response time of participants from the second group of speakers, or as, e.g., the customer response time in the context of a sales meeting with a customer. In some embodiments involving a sales meeting, for example, the difference between sales representatives' response time and the customer's response time is important in evaluating engagement of the customer. In some embodiments, this measures how long it takes the difference between how long it takes for the representative to reply to what a customer says, and how long it takes for a customer to reply to what a representative says. The discrepancy between the two is indicative of which side is more prepared and more attentively listening, which indicates a quick response time and therefore suggests more engagement within the communication session. In many cases, the representative should generally respond more quickly than the customer, because the representative is more prepared than the customer during a sales pitch. In some embodiments, this generality is accounted for within the metric.

In various embodiments, engagement metrics used may include one or more content-based engagement metrics. For example, engagement metrics may include, e.g., whether the second group of speakers asks questions during the communication session; how many questions they asked; the number of questions asked within a 60-minute meeting, normalized for different meeting lengths. In some embodiments, content-based engagement metrics include consideration of the relevance of what the customer says relative to what the representative had brought up, which may indicate increased or decreased engagement.

In some embodiments, generating statistical metrics for engagement metrics may include identifying a number of linguistic features within each sentence of the utterance. Such linguistic features may comprise one or more of, e.g.: words or tokens, lemmas, parts of speech ("POS"), dependencies (i.e., syntactic dependencies, or the relation between tokens), morphology, word shapes, alpha characters, and/or words in a stop list. In various embodiments, linguistic features may include, e.g., tokenization, named entity recognition, dependency parsing, pre-trained work vectors and similarity, built-in visualizers, or any other suitable features or capabilities of linguistic features analysis.

In some embodiments, part-of-speech (hereinafter "POS") tagging is used to label parts of speech within the spoken sentences, and to help identify the intent, meaning, or other content-based or grammatical characteristics of the sentence that may be relevant to engagement. In some embodiments, one or more sentence embedding models are employed to determine how close the segments of the interaction are to one another, which also may be relevant to engagement.

In some embodiments, the system parses and tags sentences within the utterances from speakers identified in the transcript. In some embodiments, one or more trained models and/or statistical models can be configured to predict which tag or label of a model applies next in a sentence, given the learned context. In some embodiments, such models are trained on training data which includes enough examples for the model to make predictions that generalize across the language being used. For example, such a trained model may recognize that a word following "the" in English is most likely a noun.

An example of POS tagging and identification of linguistic features is illustrated in FIG. 3. The illustrated chart show tokens (in rows) within a sentence, and labels applied for various characteristics and traits for those tokens, including, e.g.: the text of the token itself, the lemma or base form of the word, simple POS tag, detailed POS tag, syntactic dependency or relation between tokens, the word shape (e.g., capitalization, punctuation, digits), whether the token is an alpha character, and whether the token is part of a stop list containing, i.e., the most common words in the language. In various embodiments, the system can extract some or all of such data from tokens found within sentences of a transcript. In some embodiments, this data can then be used for calculating statistical metrics for engagement metrics. Such calculations can be based on the parts-of-speech simple or detailed tags, the dependencies between words, and more.

Returning to FIG. 2, in some embodiments, a distribution of relevant statistical metrics from each of the engagement metrics is generated. In some embodiments, the distribution is a Gaussian distribution expressed in terms of a mean and a standard deviation. In some embodiments, the distribution has a bell-shaped curve or similar curve, and the measurement values will follow a normal distribution with an equal number of measurements above and below the mean value.

In some embodiments, the system compares the statistical metrics for the communication session to distributions determined for a number of previous communication sessions. In some embodiments, the previous communication sessions represent previous communication sessions of the same type as the current communication session. Distribution data for a large number of communication sessions may be used for a particular engagement metric, and compared against the statistical metric(s) for the engagement metric within the current communication session. In some embodiments, these comparisons may additionally be used to determine an engagement score for the communication session, by taking into account statistical distributions from other, previous communication sessions. Examples of how such comparisons may be used are described below with respect to FIG. 4.

Figure 4:
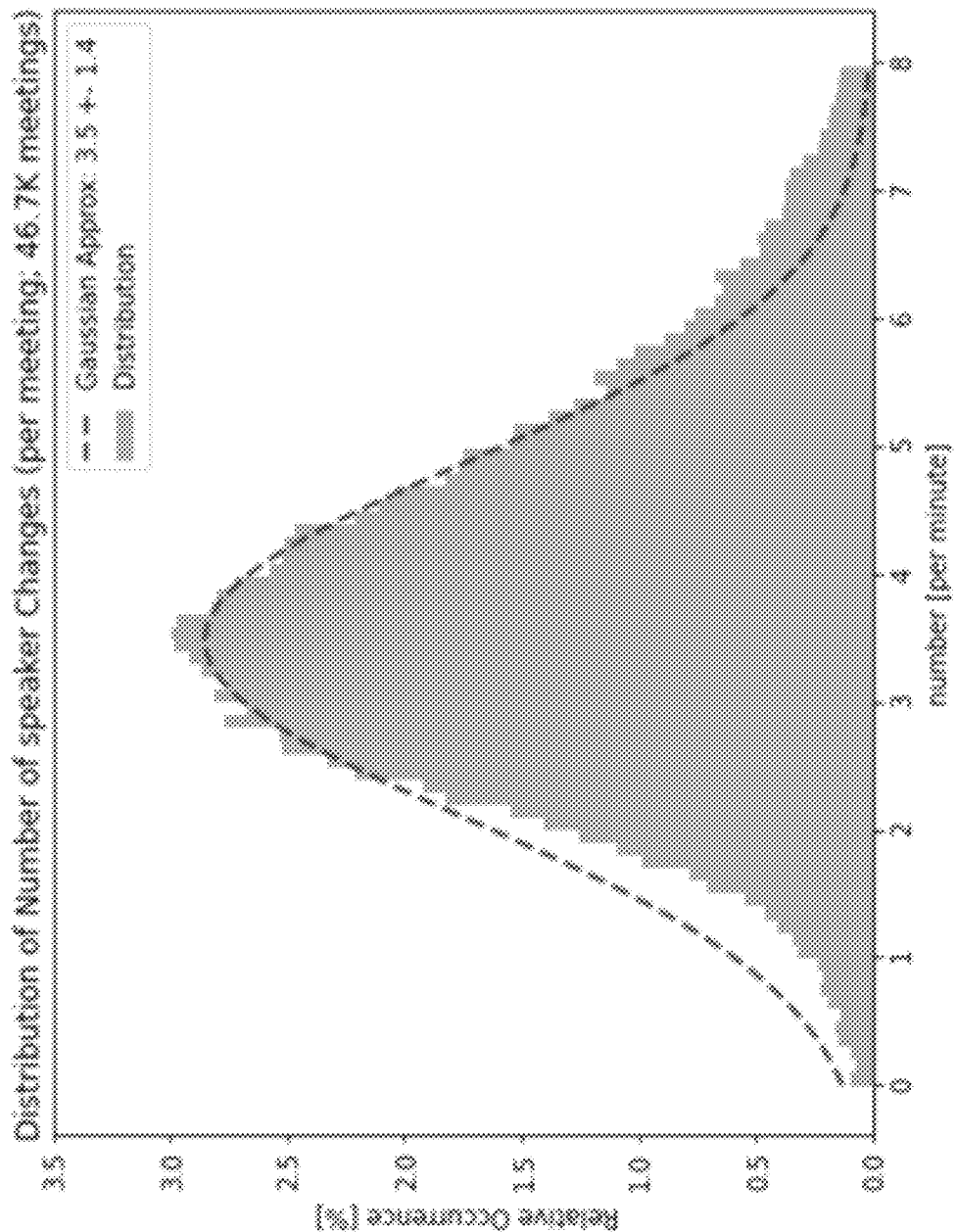
FIG. 4 is a diagram illustrating one example embodiment of a distribution curve for an engagement metric.

One example embodiment of a distribution curve for an engagement metric is illustrated in FIG. 4. Within the illustrated example, a Gaussian distribution curve is shown. The X axis presents a distribution of the number of speaker changes per meeting for a number of previous communication sessions. In the illustrated example, the previous communication sessions constitute a large corpus of data, with 46,700 meetings being included within the distribution. In some embodiments, the previous communication sessions are limited to sessions of the same meeting type (e.g., sales meeting) as the current communication session. The Y axis presents a percentage of relative occurrence of speaker changes. That is, the number of speaker changes in a given meeting is divided by the length of the meeting to determine the relative occurrence as a percentage. In this case, the distribution curve is shown for a range of 0 through 8 speaker changes per meeting.

When looking at a distribution of speaker changes per minute across a meeting, one can see a distribution that has a positive tail. This is to be expected, as there would never be a negative tail if there cannot be a negative number of speaker changes per minute. Using the Gaussian distribution curve, statistical metrics can be calculated, such as, e.g., the mean and standard deviation of the number of speaker changes per meeting across the large corpus of meetings. Thus, the engagement metric can be parameterized by forcing a normal Gaussian representation on them, then extracting statistical metrics from this representation. However, this behavior of the engagement metric can be different depending on different use cases and different approaches. Thus, in some embodiments, the associated statistical metric is normalized based on previous communication sessions that were actually held. Specifically, in some embodiments, transcript data from the previous communication sessions can be retrieved, utterances can be extracted, and engagement metrics can be statistically analyzed to add data points to a statistical distribution. The distributions can then be regenerated, and the results can be scaled accordingly.

For example, a member of a sales team has recently finished a sales meeting with a prospective customer. During that meeting, there was an average of 6 speaker changes per minute, which constitutes a statistical metric for the engagement metric of "number of speaker changes per minute". Based on this statistical metric alone, one might naively conclude that the meeting had a high level of engagement for the prospective customer.

A distribution is then generated for the statistic, which is the distribution in the example of FIG. 4. For this example, the highest peak can be approximated as a Gaussian representation with a mean of roughly 3.5 and a standard deviation of roughly 1.4. In some embodiments, to convert the Gaussian distribution into meaningful statistical metrics for an engagement metric, the system can compute the number of speaker changes and determine the areas subtended under the curve to that point. That is, in some embodiments, the z-score of the measurement is computed, and the system then calculates the cumulative percentage of that z-score. In the chart, the number "6" on the bottom axis represents the average of 6 speaker changes per minute within the meeting. The distribution curve for this engagement metric suggests that this number of changes per minute, 6, is in the 90% or higher range for average number of speaker changes per minute for all 46.7K meetings. Thus, the distribution curve confirms that this particular statistic highly suggests engagement with the prospective customer.

In a different meeting, a sales representative may be selling a different product, or may be presenting a demo of a product. For a product presentation, one likely wouldn't expect 3.5 speaker changes per minute. Instead, you may receive 1 speaker change or even less than 1. For that particular domain, the system is capable of building up what that distribution looks like for that particular class of meetings. In some embodiments, big data techniques are used, such as, e.g., the process of collecting a significant amount of data over time; segmenting the data properly; and regenerating the statistical metrics for engagement metrics and/or engagement score based on the actual distribution which is representative of the particular class of meeting being analyzed.

In another example and in some embodiments, to calculate the average time spoken by a customer or representative during a sales meeting, the system can calculate the time subtended by each span of utterances belonging to a single speaker type (i.e., first group or second group), and then calculate a mean of those values over the whole meeting. The distribution of those values is then determined as a Gaussian distribution. The data may show, for example, that representatives typically speak more than customers, with a peak at about 10 second intervals, while a typical customer talk time peaks at about 5 second intervals.

In another example and in some embodiments, one engagement metric may be the difference in talk time between the representative and the customer in a sales meeting. This can be determined by the system calculating the ratio of the two variates, i.e., mean customer talk time/mean representative talk time. In some embodiments, to calculate statistical metrics for this engagement metric, the system can compute the z-score the measurement, then calculate the cumulative percentage of that z-score.

In another example and in some embodiments, one engagement metric may be the time lag between speaker group changes. One indication of increased engagement may be that in a more engaged discussion, the time between speaker group changes will be smaller. In some embodiments, to calculate statistical metrics for this engagement metric, the system can calculate the time lag between speaker group changes for all transitions in a meeting, then calculate the average of those time lags to obtain an average speaker group time change. In some embodiments, the system can obtain this average for both customer-to-representative and representative-to-customer, or otherwise from a first group to a second group and vice versa. The data may show that both distributions peak at just below 1 second, indicating that the typical pause in conversation is around that value, with a long positive tail indicating that longer pauses take place between transitions. In addition, the positive tail may be more pronounced in transitions from the first group to the second group (e.g., the representative to the customer), which makes sense as the first group will typically drive the conversation and have quicker turnarounds. In some embodiments, the distribution is normalized by the transition time from the second group to the first group (e.g., the customer to the representative). In some embodiments, the system may then compute the z-score of the measurement, then calculate 1 minus the cumulative percentage of that z-score.

Returning to FIG. 2, at step 260, the system assigns a weight to each of the engagement metrics. The weights assigned for engagement metrics are representative of the importance of the engagement metric in the determination of an overall engagement score (which is performed in step 270, described below).

An example of suggested weights assigned to engagement metrics is illustrated in FIG. 5. In the illustrated example, the number of speaker changes is given a suggested weight of 0.5, higher than the other two engagement metrics used, with the rationale that it seems like the most likely metric for determining engagement. The mean or "mu" is 3.5, which represents the most likely ratio for this metric, and the standard deviation or "sigma" is 1.4. Meanwhile, the speaker talk ratio is given a suggested weight of 0.2, lower than the other two engagement metrics used, with the rationale that it seems to be the most biased metric of the three. This is because in, for example, a sales meeting, a representative will often speak more than a customer, so the metric may be weighted less to compensate for that. The mean is 0.6, while the standard deviation is 0.2. Finally, the speaker transition lag engagement metric is given a suggested weight of 0.3, weighted in between the two other engagement metrics, which may result in a sensible distribution that is scalable without being spiky.

In some embodiments, such weights can be adjusted and readjusted as needed. In some embodiments, the parameters "mu" and "sigma" are configurable parameters. As new data is ingested into the statistical models, the system can automatically refine these values and update them without any sort of modification to the models themselves. This minimizes the time it would otherwise take for a developer to implement such updates. In some embodiments, such updates are populated in real time, with no server downtime or lag. In some embodiments, this also improves scalability by allowing for the same framework for determining engagement to be employed across various different domains or meeting types.

In some embodiments, the system may receive one or more labels which are representative of whether the second group of speakers was engaged during the communication session. These labels may come from participants from the first group of speakers, such that, e.g., sales representatives can report whether customers were engaged during the meeting or not. They may also come from one or more non-participants, such as a manager viewing a recording of a sales meeting, then labeling whether the customer appeared engaged or not. In some embodiments, these labels can be fed into the models and based on this, the system can automatically adjust one or more weights assigned to the engagement metrics based on the label.

In some embodiments, the system may receive data from one or more additional communication sessions held simultaneously or after the communication session in question, and then adjust one or more of the weights assigned to the engagement metrics based on the data from the additional communication sessions. In this way, data from future relevant sessions may be used to update the model and the determination of engagement for this particular communication session.

At step 270, the system determines an engagement score for the communication session based on the statistical metrics for the engagement metrics and the assigned weights for the engagement metrics. In some embodiments, the system calculates a weighted average of the statistical metrics for the engagement metrics, based on the assigned weights. In other embodiments, any other calculation based on the engagement metrics and the assigned weights can be used. In some embodiments, the engagement score is further determined based on distributions of statistical metrics from previous communication sessions.

In some embodiments, upon determining a raw engagement score which equals the weighted average of the engagement metrics, a cumulative distribution function can be used based on where the individual communication session falls within the curve which includes previous communication sessions, and a score from 0 to 100 can be obtained. This represents a more easily human-understandable engagement score expressed as a percentage or other value from 0 to 100 based on a large corpus of communication session data.

At step 280, the system presents, to one or more users, the engagement score for the communication session.

In some embodiments, the engagement score data is displayed at one or more client devices associated with users of a communication platform which maintains and/or hosts the communication session. In some embodiments, the client device(s) are configured to display a UI related to the communication platform and/or communication session. In various embodiments, the one or more client devices may be, e.g., one or more desktop computers, smartphones, laptops, tablets, headsets or other wearable devices configured for virtual reality (VR), augmented reality (AR), or mixed reality, or any other suitable client device for displaying such a UI.

In various embodiments, the client devices may be associated with and/or operated by one or more of: one or more participants of the communication session associated with the first group and/or the prespecified organization that the first group represents, one or more administrators or hosts of the communication session, one or more users within an organizational reporting chain of participants of the communication session, and/or one or more authorized users. In some embodiments, users may be authorized for their client devices to receive a UI presenting an engagement score and/or one of the engagement metrics if they are granted permission to access, view, and/or modify such data. In some embodiments, a UI for permissions control may be presented to one or more hosts, administrators, or authorized individuals which allows them to customize a number of settings for providing permissions to users with respect to such data. For example, a user authorized to manage permissions controls for a communication session, or all communication sessions for a particular organization, may be able to add participants, remove participants, add, remove, or modify the particular data or types of data which will be presented for such a session, and more.

In some embodiments, within this displayed UI, data corresponding to engagement analysis can be displayed. For example, a UI may be shown which displays aggregate analytics data pertaining to a sales team's meetings with clients over multiple conversations and communication sessions. Within this aggregate analytics data, the engagement score and/or engagement metrics can be displayed with respect to the entire team's performance. In some embodiments, this data is additionally or alternatively displayed for each individual member of a group. In some embodiments, rather than aggregate analytics data or data shown for all team members, individual and/or customized analytics data for a particular participant can be viewed, including potentially a wide variety of data for that particular individual.

In some embodiments, the displayed UI may additionally or alternatively present one or more windows which present data with respect to an individual recording, such as the most recent conversation or a currently-in-progress conversation produced in a single given communication session. Users may be able to access a playback recording of the communication session, as well as see various pieces of data with respect to the communication session. In some embodiments, a UI element with a playback recording may present one or more pieces of aggregate analytics data or individual analytics data corresponding to the communication session as a whole, the particular topic segment the user is playing back, or any other suitable data which can be presented. An example of such a UI element is illustrated in FIG. 5, described in further detail below.

Figure 6:
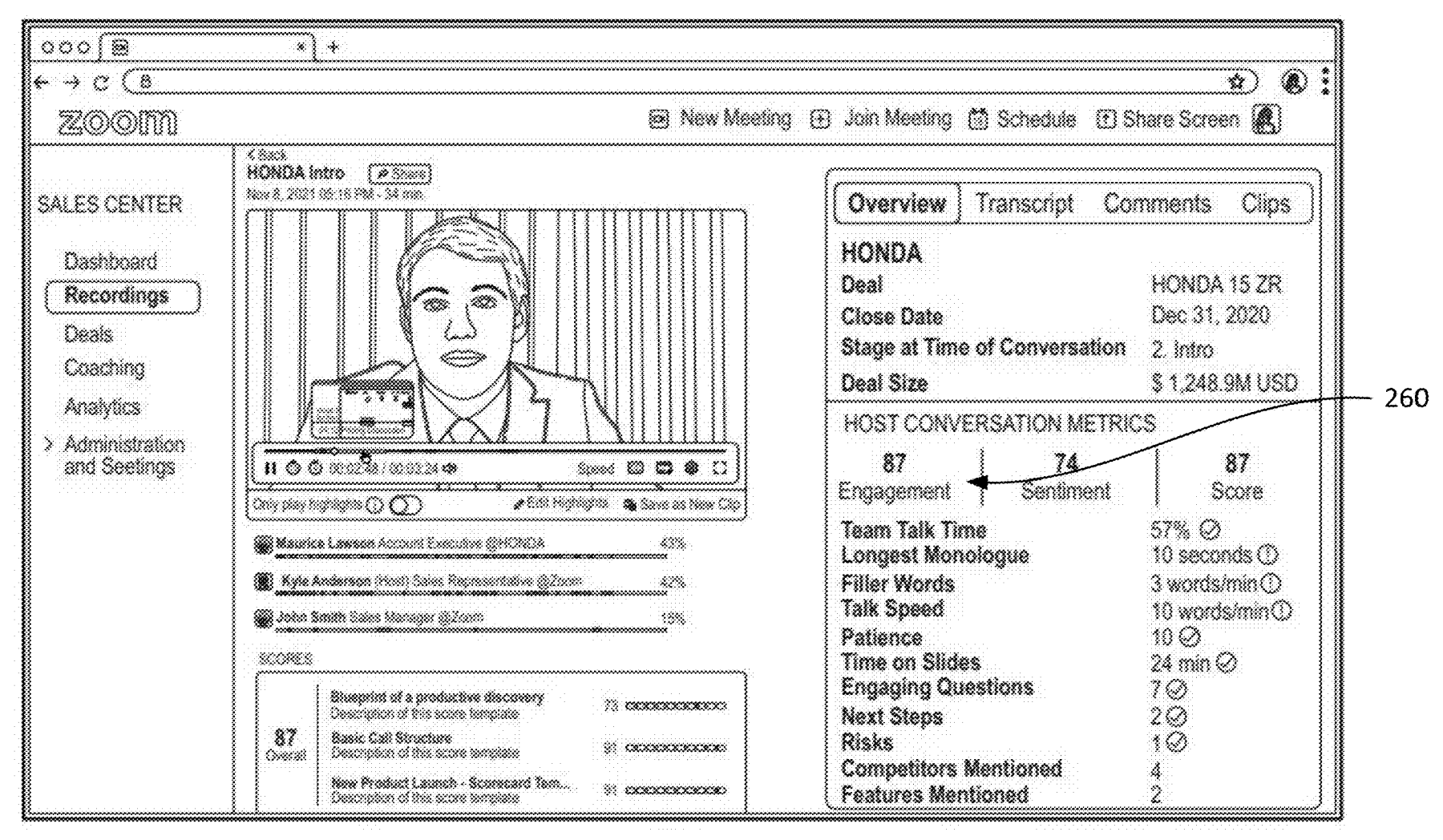

FIG. 6 is a diagram illustrating one example embodiment of a user interface for presenting an engagement score for a communication session.

Within the illustrated UI, a "Recordings" tab is presented at a display of a client device. Information about a specific recording of a communication session is displayed, including a video of the recording itself which can be played back in various ways or adjusted to skip to different times or topics within the video. A timeline allows the user to skip to different topic, and when the user hovers over a topic, a timestamp as well as a topic segment name is displayed.

On the right side of the window, a number of aggregate analytics data and/or metrics for the entire sales team are displayed with respect to the one, specific recording and communication session, including an "Engagement" metric 260 for the entire team. The Engagement metric 260 shows the overall engagement score for the meeting expressed as a number from 0 to 100, which in this example is 87. In some embodiments, additional data may be shown, such as a recommended engagement score for the session based on previous similar communication session where the customer was verified to be engaged, or an average engagement score of previous similar communication sessions.

In some embodiments, this UI for the recording may additionally or alternatively show such metrics, including the engagement score, for a particular topic segment within the conversation, depending on where in the video recording the participant has skipped to or is currently playing back. For example, if the user skips to timestamp 04:12 in the recording, which is labeled with topic segment "Pricing Discussion", then the UI may additionally or alternatively show a calculated engagement score for that topic segment alone. In this way, users, e.g., sales teams and their individual sales representatives can view the engagement score within the meeting for each individual topic, not just as a whole for the recording. This can be useful, for example, if a sales representative learns via the data that a prospective customer was not very engaged during a description or pitch of a product, and was more engaged during a pricing discussion. The participant may then be able to correct this to improve engagement during the description or pitch, thus potentially improving his or her sales performance and leading to better sales results.

Figure 7:
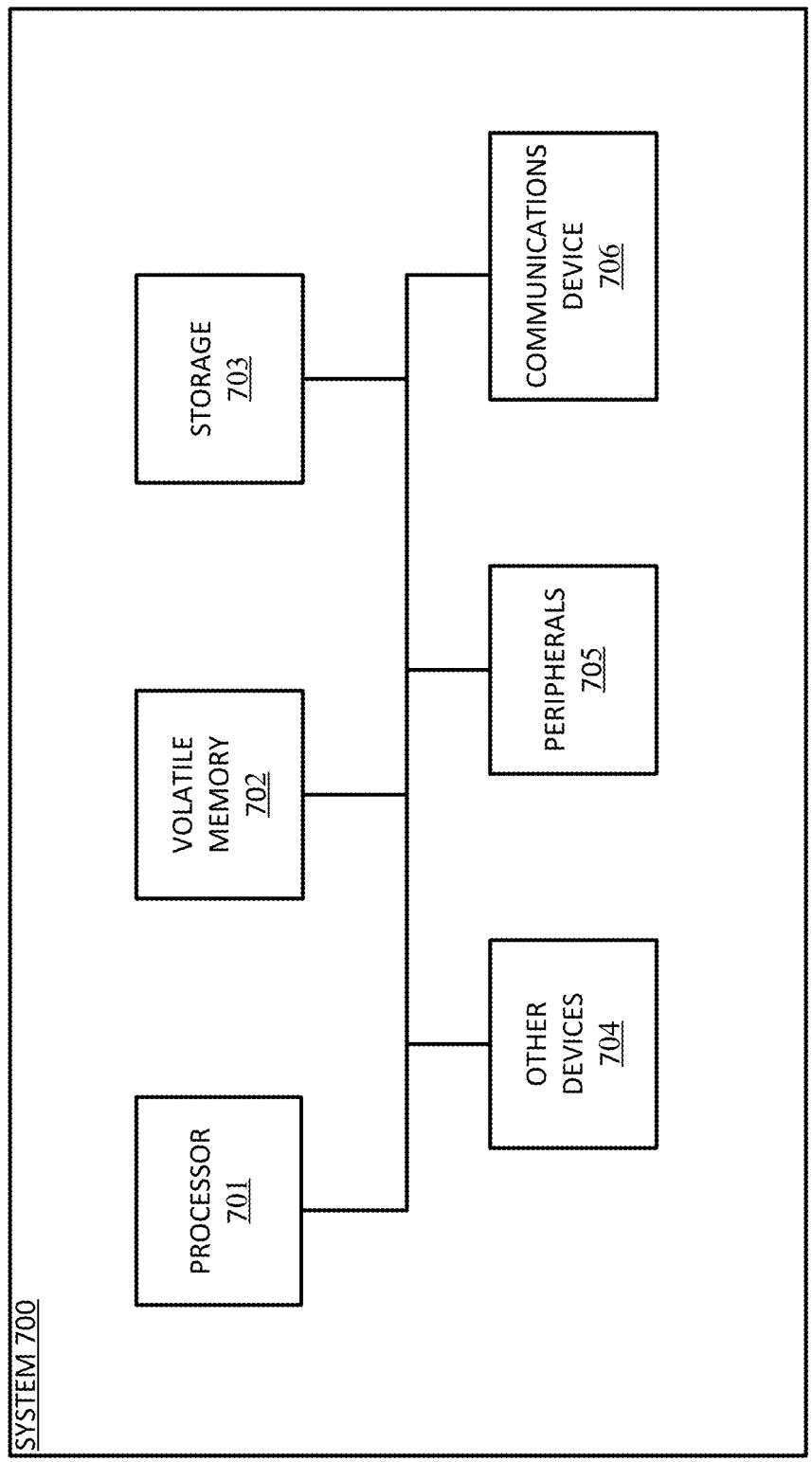
FIG. 7 is a diagram illustrating an exemplary computer that may perform processing in some embodiments.

FIG. 7 is a diagram illustrating an exemplary computer that may perform processing in some embodiments. Exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 701.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-R and DVD-R recorders/players. Communications device 706 may connect the computer 100 to an external medium. For example, communications device 706 may take the form of a network adapter that provides communications to a network. A computer 700 may also include a variety of other devices 704. The various components of the computer 700 may be connected by a connection medium such as a bus, crossbar, or network.

It will be appreciated that the present disclosure may include any one and up to all of the following examples.

Example 1. A method, comprising: connecting to a communication session with a plurality of participants; receiving a transcript of a conversation between the participants produced during the communication session; extracting, from the transcript, a plurality of utterances comprising one or more sentences spoken by the participants; associating a subset of the plurality of utterances with a first group of speakers and the remaining subset of the plurality of utterances with a second group of speakers; calculating one or more statistical metrics for each of a plurality of engagement metrics for the communication session based on the utterances of the first group of speakers and the utterances of the second group of speakers; assigning a weight to each of the engagement metrics; determining an engagement score for the communication session based on the statistical metrics and assigned weights for the engagement metrics; and presenting, to one or more users, the engagement score for the communication session.

Example 2. The method of example 1, further comprising: comparing the statistical metrics for the communication session to a plurality of distributions determined for a plurality of previous communication sessions, determining the engagement score being further based on the comparison of the statistical metrics to the plurality of distributions.

Example 3. The method of example 2, wherein the plurality of previous communication sessions are of the same meeting type as the communication session.

Example 4. The method of any of examples 1 to 3, wherein one of the engagement metrics is representative of the number of speaker changes between the first group of speakers and the second group of speakers.

Example 5. The method of example 4, wherein the statistical metrics for the number of speaker changes between the first group of speakers and second group of speakers is normalized per minute during the communication session.

Example 6. The method of any of examples 1 to 5, wherein one of the engagement metrics is representative of the ratio of the first group of speakers' speaking time to the second group of speakers' speaking time.

Example 7. The method of example 6, wherein the ratio of the first group of speakers' speaking time to the second group of speakers' speaking time is normalized for different meeting lengths.

Example 8. The method of any of examples 1 to 7, wherein one of the engagement metrics is representative of a ratio of time lag between statements from the first group of speakers and responses from the second group of speakers during the communication session.

Example 9. The method of example 8, wherein the ratio of time lag between statements from the first group of speakers and responses from the second group of speakers is normalized based on the ratio of time lag between statements from the second group of speakers and responses from the first group of speakers.

Example 10 The method of any of examples 1 to 9, wherein: the communication session is a sales session with one or more prospective customers, the first group of speakers represents a sales team, and the second group of speakers represents a customer or prospective customer of the sales team.

Example 11. The method of any of examples 1 to 10, wherein determining the overall engagement score comprises applying a cumulative distribution function to the weighted average of the statistical metrics for the engagement metrics.

Example 12. The method of any of examples 1 to 11, wherein calculating the statistical metrics for the plurality of engagement metrics comprises calculating at least an average for the engagement metric and a standard deviation for the engagement metric.

Example 13. The method of any of examples 1 to 12, further comprising: receiving, based on the engagement score for the communication session, a label representative of whether the second group of speakers was engaged during the communication session; and adjusting one or more weights assigned to the engagement metrics based on the label.

Example 14. The method of any of examples 1 to 13, further comprising: receiving data from one or more additional communication sessions; and adjusting one or more weights assigned to the engagement metrics based on the data from the one or more additional communication sessions.

Example 15. The method of example 14, wherein calculating the statistical metrics for the plurality of engagement metrics is based on analyzing the parts of speech of the one or more sentences in at least a subset of the utterances.

Example 16. The method of any of examples 1 to 15, wherein the utterances extracted from the transcript further comprise timestamps associated with the beginning of speaker statements.

Example 17. The method of any of examples 1 to 16, further comprising: receiving a plurality of topic segments of the communication session with associated timestamps; and determining a topic segment score for each of the topic segments of the communication session based on the associated timestamps for the topic segments.

Example 19. The method of any of examples 1 to 17, wherein at least a subset of the engagement metrics are content-based engagement metrics.

Example 20. A communication system comprising one or more processors configured to perform the operations of: connecting to a communication session with a plurality of participants; receiving a transcript of a conversation between the participants produced during the communication session; extracting, from the transcript, a plurality of utterances comprising one or more sentences spoken by the participants; associating a subset of the plurality of utterances with a first group of speakers and the remaining subset of the plurality of utterances with a second group of speakers; calculating one or more statistical metrics for each of a plurality of engagement metrics for the communication session based on the utterances of the first group of speakers and the utterances of the second group of speakers; assigning a weight to each of the engagement metrics; determining an engagement score for the communication session based on the statistical metrics and assigned weights for the engagement metrics; and presenting, to one or more users, the engagement score for the communication session.

Example 21. The communication system of example 20, wherein the one or more processors are further configured to perform the operations of: receiving a plurality of topic segments of the communication session with associated timestamps; and determining a topic segment score for each of the topic segments of the communication session based on the associated timestamps for the topic segments.

Example 22. The communication system of any of examples 20 and 21, wherein at least a subset of the engagement metrics are content-based engagement metrics.

Example 23. The communication system of any of examples 20 to 22, wherein the one or more processors are further configured to perform the operations of: comparing the statistical metrics for the communication session to a plurality of distributions determined for a plurality of previous communication sessions, determining the engagement score being further based on the comparison of the statistical metrics to the plurality of distributions.

Example 24. The communication system of example 23, wherein the plurality of previous communication sessions are of the same meeting type as the communication session.

Example 25. The communication system of any of examples 20 to 24, wherein one of the engagement metrics is representative of the number of speaker changes between the first group of speakers and the second group of speakers.

Example 26. The communication system of example 25, wherein the statistical metrics for the number of speaker changes between the first group of speakers and second group of speakers is normalized per minute during the communication session.

Example 27. The communication system of any of examples 20 to 26, wherein one of the engagement metrics is representative of the ratio of the first group of speakers' speaking time to the second group of speakers' speaking time.

Example 28. The communication system of example 27, wherein the ratio of the first group of speakers' speaking time to the second group of speakers' speaking time is normalized for different meeting lengths.

Example 29. The communication system of any of examples 20 to 28, wherein one of the engagement metrics is representative of a ratio of time lag between statements from the first group of speakers and responses from the second group of speakers during the communication session.

Example 30. The communication system of example 29, wherein the ratio of time lag between statements from the first group of speakers and responses from the second group of speakers is normalized based on the ratio of time lag between statements from the second group of speakers and responses from the first group of speakers.

Example 31. The communication system of any of examples 20 to 30, wherein: the communication session is a sales session with one or more prospective customers, the first group of speakers represents a sales team, and the second group of speakers represents a customer or prospective customer of the sales team.

Example 32. The communication system of any of examples 20 to 31, wherein determining the overall engagement score comprises applying a cumulative distribution function to the weighted average of the statistical metrics for the engagement metrics.

Example 33. The communication system of any of examples 20 to 32, wherein calculating the statistical metrics for the plurality of engagement metrics comprises calculating at least an average for the engagement metric and a standard deviation for the engagement metric.

Example 34. The communication system of any of examples 20 to 33, wherein the one or more processors are further configured to perform the operations of: receiving, based on the engagement score for the communication session, a label representative of whether the second group of speakers was engaged during the communication session; and adjusting one or more weights assigned to the engagement metrics based on the label.

Example 35. The communication system of any of examples 20 to 34, wherein the one or more processors are further configured to perform the operations of: receiving data from one or more additional communication sessions; and adjusting one or more weights assigned to the engagement metrics based on the data from the one or more additional communication sessions.

Example 36. The communication system of example 35, wherein calculating the statistical metrics for the plurality of engagement metrics is based on analyzing the parts of speech of the one or more sentences in at least a subset of the utterances.

Example 37. The communication system of any of examples 20 to 36, wherein the utterances extracted from the transcript further comprise timestamps associated with the beginning of speaker statements.

Example 38. The communication system of any of examples 20 to 37, wherein the one or more processors are further configured to perform the operations of: receiving a plurality of topic segments of the communication session with associated timestamps; and determining a topic segment score for each of the topic segments of the communication session based on the associated timestamps for the topic segments.

Example 39. The communication system of any of examples 20 to 38, wherein at least a subset of the engagement metrics are content-based engagement metrics.

Example 40. A non-transitory computer-readable medium containing instructions for generating a note with session content from a communication session, comprising: instructions for connecting to a communication session with a plurality of participants; instructions for receiving a transcript of a conversation between the participants produced during the communication session; instructions for extracting, from the transcript, a plurality of utterances comprising one or more sentences spoken by the participants; instructions for associating a subset of the plurality of utterances with a first group of speakers and the remaining subset of the plurality of utterances with a second group of speakers; instructions for calculating one or more statistical metrics for each of a plurality of engagement metrics for the communication session based on the utterances of the first group of speakers and the utterances of the second group of speakers; instructions for assigning a weight to each of the engagement metrics; instructions for determining an engagement score for the communication session based on the statistical metrics and assigned weights for the engagement metrics; and instructions for presenting, to one or more users, the engagement score for the communication session.

Example 41. The non-transitory computer-readable medium of example 40, further comprising: instructions for comparing the statistical metrics for the communication session to a plurality of distributions determined for a plurality of previous communication sessions, determining the engagement score being further based on the comparison of the statistical metrics to the plurality of distributions.

Example 42. The non-transitory computer-readable medium of example 41, wherein the plurality of previous communication sessions are of the same meeting type as the communication session.

Example 43. The non-transitory computer-readable medium of any of examples 40 to 42, wherein one of the engagement metrics is representative of the number of speaker changes between the first group of speakers and the second group of speakers.

Example 44. The non-transitory computer-readable medium of example 43, wherein the statistical metrics for the number of speaker changes between the first group of speakers and second group of speakers is normalized per minute during the communication session.

Example 45. The non-transitory computer-readable medium of any of examples 40 to 44, wherein one of the engagement metrics is representative of the ratio of the first group of speakers' speaking time to the second group of speakers' speaking time.

Example 46. The non-transitory computer-readable medium of example 45, wherein the ratio of the first group of speakers' speaking time to the second group of speakers' speaking time is normalized for different meeting lengths.

Example 47. The non-transitory computer-readable medium of any of examples 40 to 46, wherein one of the engagement metrics is representative of a ratio of time lag between statements from the first group of speakers and responses from the second group of speakers during the communication session.

Example 48. The non-transitory computer-readable medium of example 47, wherein the ratio of time lag between statements from the first group of speakers and responses from the second group of speakers is normalized based on the ratio of time lag between statements from the second group of speakers and responses from the first group of speakers.

Example 49. The non-transitory computer-readable medium of any of examples 40 to 48, wherein: the communication session is a sales session with one or more prospective customers, the first group of speakers represents a sales team, and the second group of speakers represents a customer or prospective customer of the sales team.

Example 50. The non-transitory computer-readable medium of any of examples 40 to 49, wherein determining the overall engagement score comprises applying a cumulative distribution function to the weighted average of the statistical metrics for the engagement metrics.

Example 51. The non-transitory computer-readable medium of any of examples 40 to 50, wherein calculating the statistical metrics for the plurality of engagement metrics comprises calculating at least an average for the engagement metric and a standard deviation for the engagement metric.

Example 52. The non-transitory computer-readable medium of any of examples 40 to 51, further comprising: instructions for receiving, based on the engagement score for the communication session, a label representative of whether the second group of speakers was engaged during the communication session; and instructions for adjusting one or more weights assigned to the engagement metrics based on the label.

Example 53. The non-transitory computer-readable medium of any of examples 40 to 52, further comprising:

instructions for receiving data from one or more additional communication sessions; and instructions for adjusting one or more weights assigned to the engagement metrics based on the data from the one or more additional communication sessions.

Example 54. The non-transitory computer-readable medium of example 53, wherein calculating the statistical metrics for the plurality of engagement metrics is based on analyzing the parts of speech of the one or more sentences in at least a subset of the utterances.

Example 55. The non-transitory computer-readable medium of any of examples 40 to 54, wherein the utterances extracted from the transcript further comprise timestamps associated with the beginning of speaker statements.

Example 56. The non-transitory computer-readable medium of any of examples 40 to 55, further comprising: instructions for receiving a plurality of topic segments of the communication session with associated timestamps; and instructions for determining a topic segment score for each of the topic segments of the communication session based on the associated timestamps for the topic segments.

Example 57. The non-transitory computer-readable medium of any of examples 40 to 56, wherein at least a subset of the engagement metrics are content-based engagement metrics.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
receiving a transcript between participants of a communication session, wherein a first portion of the transcript is associated with a first group of the participants and a second portion of the transcript is associated with a second group of the participants, wherein the first group of the participants is associated with a prespecified organization and the second group of the participants is associated with a different organization;
dynamically adjusting metric weights based on organizational groupings and a context of the communication session;
calculating engagement metrics for the communication session using the dynamically adjusted metric weights, wherein the engagement metrics are based on a ratio of time lag between data of the first group of the participants corresponding to the first portion of the transcript and data of the second group of the participants corresponding to the second portion of the transcript; and
determining an engagement score for the communication session based on the engagement metrics.

2. The method of claim 1, further comprising:
comparing the engagement metrics to a plurality of engagement metrics determined for a plurality of previous communication sessions, wherein determining the engagement score is further based on the comparison of the engagement metrics.

3. The method of claim 2, wherein the plurality of previous communication sessions are of a same meeting type as the communication session.

4. The method of claim 1, wherein one of the engagement metrics is representative of a number of speaker changes between the first group of participants and the second group of participants.

5. The method of claim 4, wherein the one of the engagement metrics for the number of speaker changes between the first group of participants and the second group of participants is normalized per minute during the communication session.

6. The method of claim 1, wherein one of the engagement metrics is representative of a ratio of the first group of participants speaking time to the second group of participants speaking time.

7. The method of claim 6, wherein the ratio of the first group of participants speaking time to the second group of participants speaking time is normalized for different meeting lengths.

8. The method of claim 1, wherein the ratio of time lag between data of the first group of participants and data of the second group of speakers is normalized based on the ratio of time lag between data of the second group of participants and data of the first group of participants.

9. The method of claim 1, further comprising: presenting the engagement score.

10. The method of claim 1, wherein determining the engagement score comprises applying a cumulative distribution function to a weighted average of the engagement metrics.

11. The method of claim 1, wherein calculating the engagement metrics comprises calculating at least an average for the engagement metric and a standard deviation for the engagement metric.

12. The method of claim 1, further comprising:
receiving, based on the engagement score for the communication session, a label representative of whether the second group of participants was engaged during the communication session; and
adjusting one or more weights assigned to the engagement metrics based on the label.

13. The method of claim 1, further comprising:
receiving data from one or more additional communication sessions; and
adjusting one or more weights assigned to the engagement metrics based on the data from the one or more additional communication sessions.

14. The method of claim 13, wherein calculating the engagement metrics is based on analyzing parts of speech of one or more sentences in at least a portion of the transcript.

15. An apparatus, comprising:
a memory; and
a processor configured to execute instructions stored in the memory to:
receive a transcript of a conversation between participants of a communication session, wherein a first portion of the transcript is associated with a first group of the participants and a second portion of the transcript is associated with a second group of the participants, wherein the first group of the participants is associated with a prespecified organization and the second group of the participants is associated with a different organization;
dynamically adjust metric weights based on organizational groupings and a context of the communication session;
calculate engagement metrics for the communication session using the dynamically adjusted metric weights, wherein the engagement metrics are based on a ratio of time lag between data of the first group of participants corresponding to the first portion of the transcript and data of the second group of participants corresponding to the second portion of the transcript; and
determine an engagement score for the communication session based on the engagement metrics.

16. The apparatus of claim 15, wherein the processor is configured to execute the instructions to:
compare the engagement metrics to a plurality of engagement metrics determined for a plurality of previous communication sessions, wherein determining the engagement score is further based on the comparison of the engagement metrics.

17. The apparatus of claim 15, wherein one of the engagement metrics is representative of a number of speaker changes between the first group of participants and the second group of participants.

18. A non-transitory computer readable medium storing instructions operable to cause one or more processors to perform operations comprising:
receiving a transcript between participants of a communication session, wherein a first portion of the transcript is associated with a first group of the participants and a second portion of the transcript is associated with a second group of the participants, wherein the first group of the participants is associated with a prespecified organization and the second group of the participants is associated with a different organization;
dynamically adjusting metric weights based on organizational groupings and a context of the communication session;
calculating engagement metrics for the communication session using the dynamically adjusted metric weights, wherein the engagement metrics are based on a ratio of time lag between data of the first group of participants corresponding to the first portion of the transcript and data of the second group of participants corresponding to the second portion of the transcript; and
determining an engagement score for the communication session based on the engagement metrics.

19. The non-transitory computer readable medium of claim 18, the operations comprising:
comparing the engagement metrics to a plurality of engagement metrics determined for a plurality of previous communication sessions, wherein determining the engagement score is further based on the comparison of the engagement metrics.

20. The non-transitory computer readable medium of claim 18, wherein one of the engagement metrics is representative of a number of speaker changes between the first group of participants and the second group of participants.

* * * * *